(12) United States Patent
Kozaczuk

(10) Patent No.: US 9,417,676 B2
(45) Date of Patent: Aug. 16, 2016

(54) INDIVIDUAL CORE VOLTAGE MARGINING

(75) Inventor: Anthony Kozaczuk, Burlingame, CA (US)

(73) Assignee: INTEL CORPORATION, Santa Clara, CA (US)

( * ) Notice: Subject to any disclaimer, the term of this patent is extended or adjusted under 35 U.S.C. 154(b) by 385 days.

(21) Appl. No.: 13/991,577

(22) PCT Filed: Dec. 29, 2011

(86) PCT No.: PCT/US2011/067704
§ 371 (c)(1),
(2), (4) Date: Jun. 4, 2013

(87) PCT Pub. No.: WO2013/101016
PCT Pub. Date: Jul. 4, 2013

(65) Prior Publication Data
US 2013/0254569 A1 Sep. 26, 2013

(51) Int. Cl.
*G06F 1/26* (2006.01)
*G06F 1/32* (2006.01)

(52) U.S. Cl.
CPC .. *G06F 1/32* (2013.01); *G06F 1/26* (2013.01); *G06F 1/3203* (2013.01); *G06F 1/329* (2013.01); *G06F 1/3287* (2013.01);
(Continued)

(58) Field of Classification Search
CPC ....... G06F 1/3203; G06F 1/3287; G06F 1/26; G06F 1/329; Y02B 60/1217
See application file for complete search history.

(56) References Cited

U.S. PATENT DOCUMENTS 6,697,952 B1 * 2/2004 King .......................... G06F 1/26
327/538
7,389,195 B2 6/2008 Capps, Jr. et al.
(Continued)

FOREIGN PATENT DOCUMENTS

KR 10-2006-0128469 A 12/2006
WO 2007/077516 A1 7/2007

OTHER PUBLICATIONS

"Notification Concerning Transmittal of International Preliminary Report on Patentability Chapter 1 of the Patent Cooperation Treaty", Jul. 10, 2014, for International Application No. PCT/US2011/067704, 6pgs.
(Continued)

*Primary Examiner* — Mohammed Rehman
*Assistant Examiner* — Gayathri Sampath
(74) *Attorney, Agent, or Firm* — Buckley, Maschoff & Talwalkar LLC

(57) ABSTRACT

Example embodiments of core voltage margining apparatus include a plurality of voltage offset blocks disposed on a multi-core processor with each voltage offset block having a voltage input coupled to receive a supply voltage level, a control input coupled to receive an offset code, and a voltage output coupled to a respective core processor in the multi-core processor, with each voltage offset block configured to offset the supply voltage level by an voltage offset value programmed by an offset code received at the control input of the voltage offset block and a voltage offset register having a like plurality of control outputs each coupled to a corresponding control input of a voltage offset block, where the voltage output register is configured to hold an offset code for each voltage offset block and to provide the offset code, programming the voltage level of a selected voltage offset block, at the control output port coupled to the selected voltage offset block.

14 Claims, 5 Drawing Sheets

(52) U.S. Cl.
CPC .......... *G06F 1/3296* (2013.01); *Y02B 60/1217* (2013.01); *Y02B 60/1285* (2013.01); *Y02B 60/144* (2013.01)

(56) References Cited

U.S. PATENT DOCUMENTS

| | | | |
|---|---|---|---|
| 7,721,119 B2 | 5/2010 | Capps, Jr. et al. | |
| 7,793,125 B2 | 9/2010 | Berry, Jr. et al. | |
| 2005/0235176 A1* | 10/2005 | Nguyen et al. | 713/500 |
| 2005/0289367 A1* | 12/2005 | Clark et al. | 713/300 |
| 2008/0052542 A1* | 2/2008 | Capps et al. | 713/300 |
| 2008/0082881 A1* | 4/2008 | Szydlowski | G06F 11/24 714/731 |
| 2009/0235108 A1 | 9/2009 | Gold et al. | |
| 2010/0125436 A1* | 5/2010 | Chase | G06F 11/24 702/186 |
| 2011/0022859 A1* | 1/2011 | More | G06F 1/3203 713/300 |
| 2012/0079290 A1* | 3/2012 | Kumar et al. | 713/300 |

OTHER PUBLICATIONS

"PCT Notification of Transmittal of the International Search Report and the Written Opinion of the International Searching Authority, or the Declaration", dated Sep. 21, 2012, for International Application No. PCT/US2011/067704, 9pgs.

"Communication re Supplementary European Search Report" dated Aug. 6, 2015 issued by the European Patent Office in EP Application No. 11878507.0, 7 pages.

* cited by examiner

INDIVIDUAL CORE VOLTAGE MARGINING

BACKGROUND OF THE INVENTION

The example embodiments described below relate generally to power saving techniques for multi-core processors.

Server farms using high-end processors can place large demands on power and cooling resources. Server system control facilities monitor power consumption and in a dynamic mode switch processors between different performance states to conserve power.

Further, mobile devices are generally battery powered and require sophisticated power control techniques to extend battery life.

Software techniques such as "core parking" used by Microsoft® operating systems consolidate processing onto the fewest possible processor cores and suspend inactive processor cores thereby reducing the power consumed by the multi-core processor.

In existing multi-core processors a voltage supply and multiple cores are integrated onto a single or multiple integrated circuits (ICs). Independent core voltage (VCC) planes are implemented for each of the multiple cores and the same voltage is supplied to each voltage plane.

DETAILED DESCRIPTION OF EXAMPLE EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Voltage margining is a process that tests the robustness of a processor at different levels of supply voltage. Generally, a manufacturer specifies a preferred level of supply voltage. However, in reality this voltage level may vary due to manufacturing tolerances and other factors. Voltage margining entails varying the supply voltage and monitoring processor performance at different levels of supply voltage.

Example embodiments allow for the use of voltage margin information about each of the core processors in a multi-core processor to offset the supply voltage of one or more of the core processors to a lower (or higher) level if the margining information for the core processor indicates that the core processor functionality is stable at that lower (or higher) supply voltage level.

Figure 1:
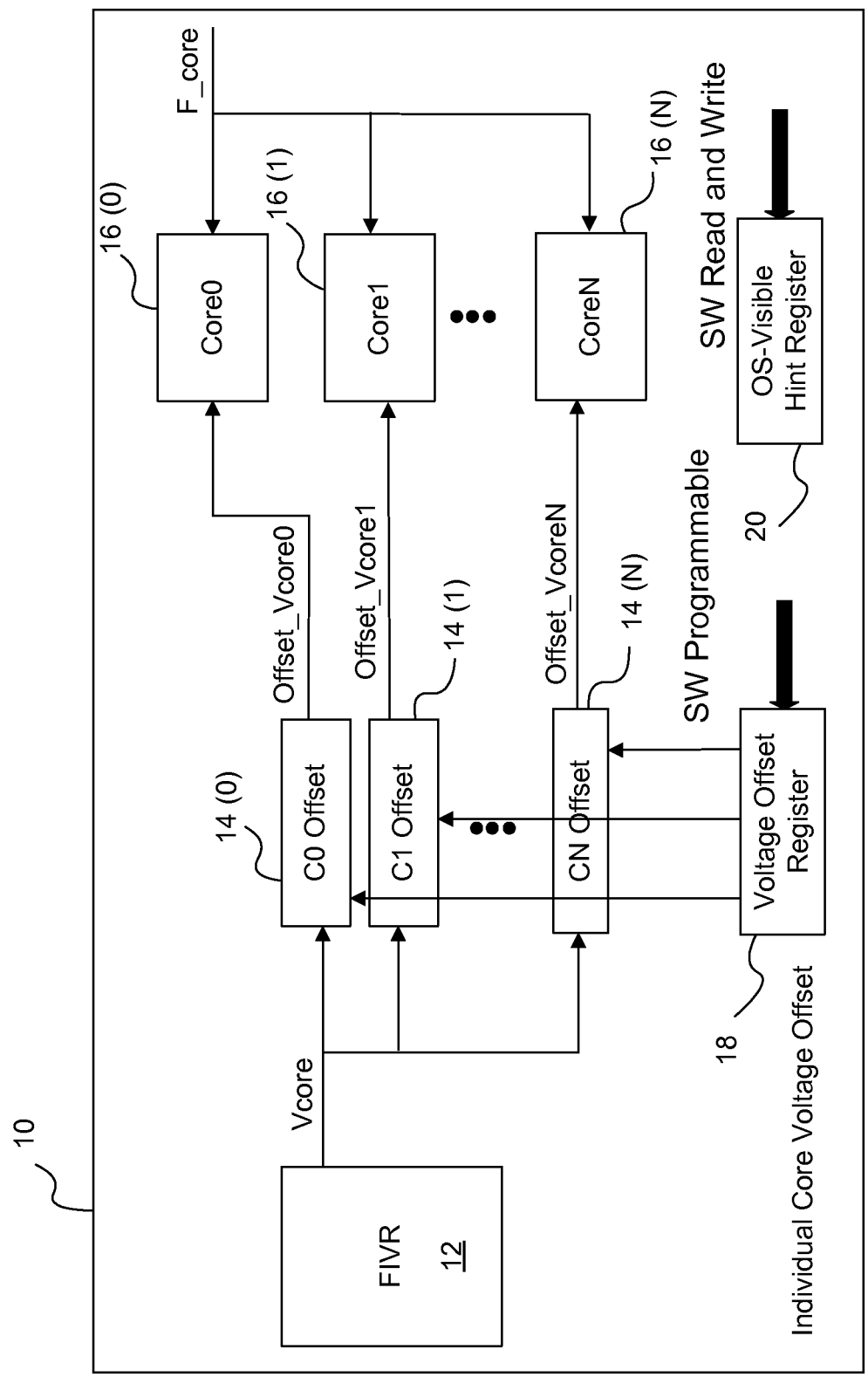
FIG. 1 is a block diagram of an example embodiment.

FIG. 1 depicts an example embodiment of a multi-core processor implemented on an integrated circuit including functional blocks for offsetting the voltage supplied to each of the core processors based on voltage margining information.

In FIG. 1 a multi-core processor 10 includes an integrated power supply 12 having a voltage output coupled to the voltage input of a group of voltage offset blocks 14(0)-14(N), where N is a positive integer, with each offset block having a voltage input coupled to receive a voltage level of VCORE. A voltage output of each voltage offset block 14(0)-14(N) is coupled to the voltage input of a corresponding processor core 16(0)-16(N). A single externally supplied clock frequency is supplied at a frequency input of each core.

FIG. 1 depicts a simple connection between the voltage output of a voltage offset block and the voltage input of a core processor. In some implementations of a multi-core processor a separate voltage plane is provided for each core and the outputs of the voltage offset blocks would be coupled to the corresponding voltage plane of the core processor to be offset.

The multi-core processor 10 also includes a programmable voltage offset register 18, having N outputs each coupled to a control input of a corresponding voltage offset block 16(0)-16(N), and an OS-Visible Hint Register 20.

In one embodiment the programmable voltage offset register stores offset codes that program specific voltage offset values for the voltage offset blocks. These codes are used by the multi-core processor hardware and could be implemented as voltage identification signals (VIDs) utilized by processors manufactured by the assignee of the current application to program voltage levels in power supplies. For example, the voltage offset blocks can be implemented as switching voltage regulators that receive binary inputs to effect a binary granularity of offset offset levels. A technique for determining and setting the offset codes will be described in detail below.

In example embodiments the value of a voltage offset voltage may be defined as a fractional percentage of VCORE or as a specific voltage level. The offset code for a specific voltage offset block is stored in the voltage offset register and controls the output voltage offset to have the value programmed by the offset code.

Figure 2:
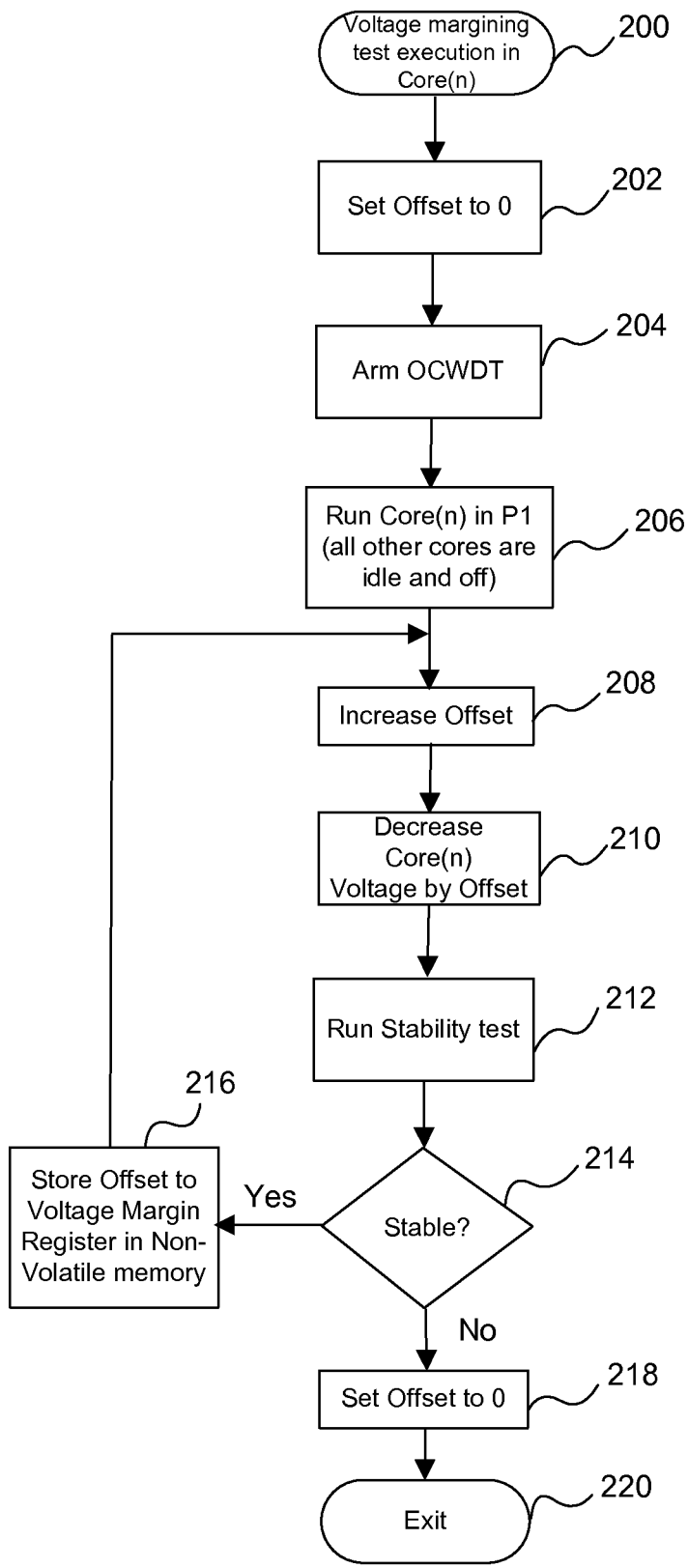
FIG. 2 is a flow chart depicting operation of an example margining software routine.

FIG. 2 is a flow chart depicting steps performed by a core voltage margining software utility to determine the voltage offsets for each core processor.

In process step 200 the voltage margining test for a specific core, e.g., Core(n), is started and in process step 202 the voltage offset is set to 0 volts and VCORE is applied to Core(n).

In process step 204 an Overclocking Watchdog timer (OC WDT) is armed. The use of a watchdog timer is required because the software utility may hang if a processor core becomes unstable at a particular applied voltage offset. The OC WDT is initially armed in process step 204 and then re-armed while the test is running. If the software utility hangs then the OC WDT expires and generates a cold reset bringing the system back up in default. On a boot, the software utility will restart where it left off and continue with the next core.

In process step 206 Core(n) is run in a first processing state (P1) and all other cores are idle and off.

Process steps 208-216 form a loop where the offset is increased by specified increments and the stability of Core(n) is tested. At some point the voltage offset will exceed the voltage margin of Core(n) and process step 214 will determine that Core(n) is no longer stable.

The utility then advances to process step 218 where the voltage offset is set back to 0 and the utility is exited in process step 220.

The core voltage margining software utility needs to be run only once to determine the margin of each individual core in a multi-core processor. The entire margining process will require several resets due to hangs that occur when taking the voltage of a specific core processor beyond an operation point. Once all the cores have been margined, the results are stored in non-volatile memory.

The stability test portion of the utility stresses only the core being margined. The length of time required for the stability test varies depending on what is being tested and can take several hours to run.

Figure 5:
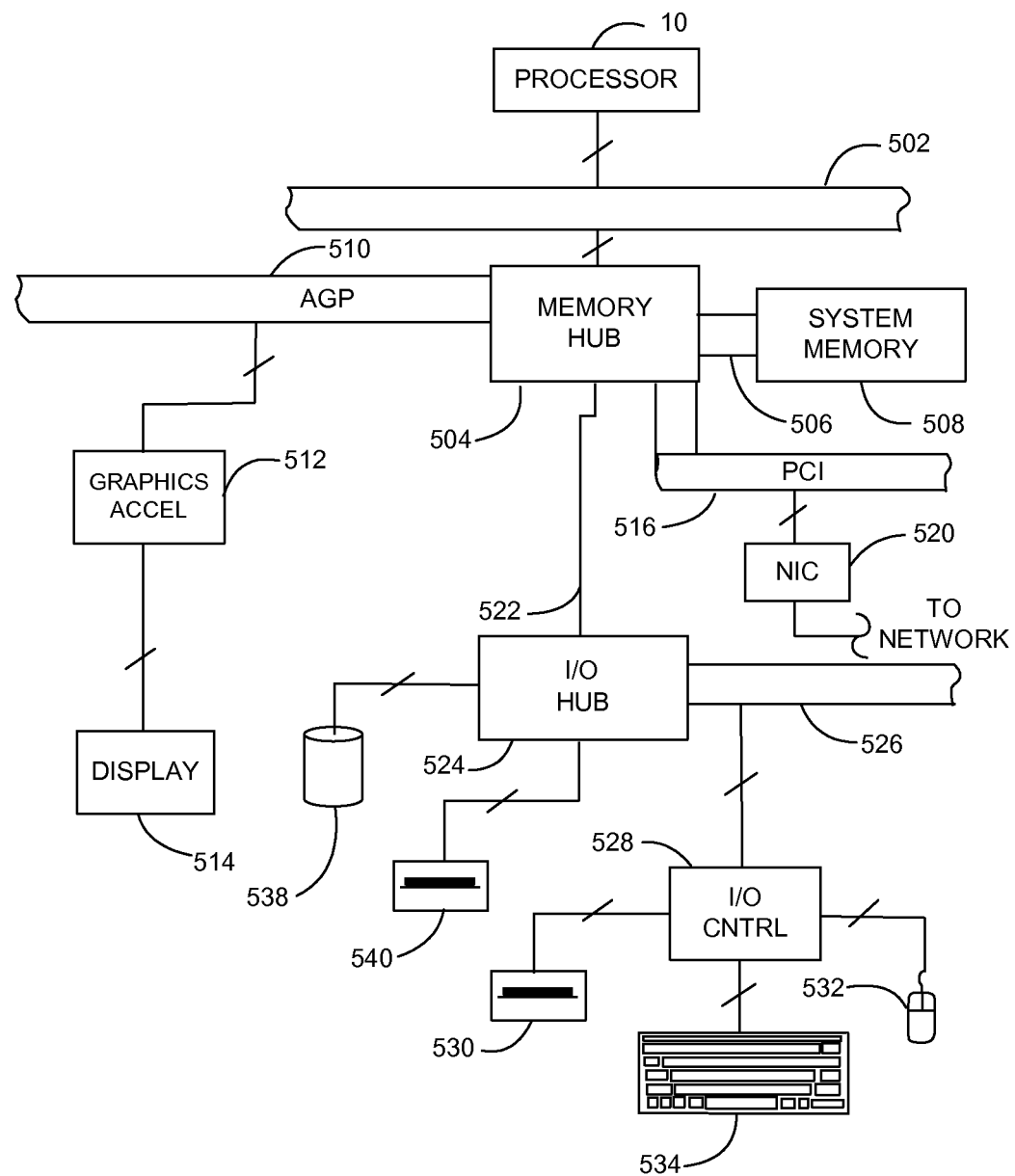
FIG. 5 is a block diagram of a system including a processor.

Subsequent to completion of the voltage margining the offset codes corresponding to the determined voltage offset for each core are stored in a voltage margin register located in non-volatile memory, for example in the system memory 508 depicted in FIG. 5.

In an example embodiment, the voltage offset register is loaded by the Basic I/O System (BIOS) which reads the voltage offsets stored by the voltage margining software utility in the voltage margin register in non-volatile memory and programs the voltage offset register. The initial value of the voltage offset is 0 (cleared) and the voltage offset value is also cleared by a reset (warm or cold). The offset is applied by BIOS dynamically during a boot without requiring a reset.

The margining utility can be run by the manufacturer and the multi-core processor can be supplied to the customer with the correct offset codes stored in the voltage offset register. In this case the processor would implement voltage margining when powered up by the customer.

Alternatively, customers can be provided the core voltage margining software utility and other required tools to operate the utility and set the offset codes in the voltage offset register.

Once voltage margining is implemented, multi-core power consumption will be reduced because the voltage level supplied to each core is reduced and power is determined by the product of voltage and current levels.

A further reduction of power consumption can be achieved by modifying the operating system (OS) to schedule threads on those core processors using lower voltage levels, those which, in this example embodiment, have the largest voltage offset values.

In one example embodiment the BIOS is modified to read the voltage offset register 18 of FIG. 1 and store indications or "hints" of the offset voltage level in the OS-Visible Voltage Hint Register 20 which, in an example embodiment, is included on the integrated circuit and can be read from and written to by software. The per core margin hint to the OS stored in the OS-Visible Voltage Margin Hint Register 20 has the format "Physical Core(n): Value 00h-0fh" where the values are in hexadecimal format and have decimal values ranging from 0-15.

In this example the voltage margins are given as 16 different values. The OS is not supplied the actual values of the margins but only the ordering of margins. The OS can use the core margin hint as one of the parameters to determine which cores to park or add based on a new policy to be added to the OS.

As a concrete example consider a multi-core processor where the Core(2) margin is the largest and the Core(0) margin is the lowest.

Physical Core(0): 0ch (Lowest margin)
Physical Core(1): 0eh
Physical Core(2): 0fh (Highest margin)
Physical Core(3): 0dh In this example, the OS would chose to run threads on core 2 for single core mode for best power reduction and, when needing to add more cores, add cores 1, 3 and then 0.

Figure 3:
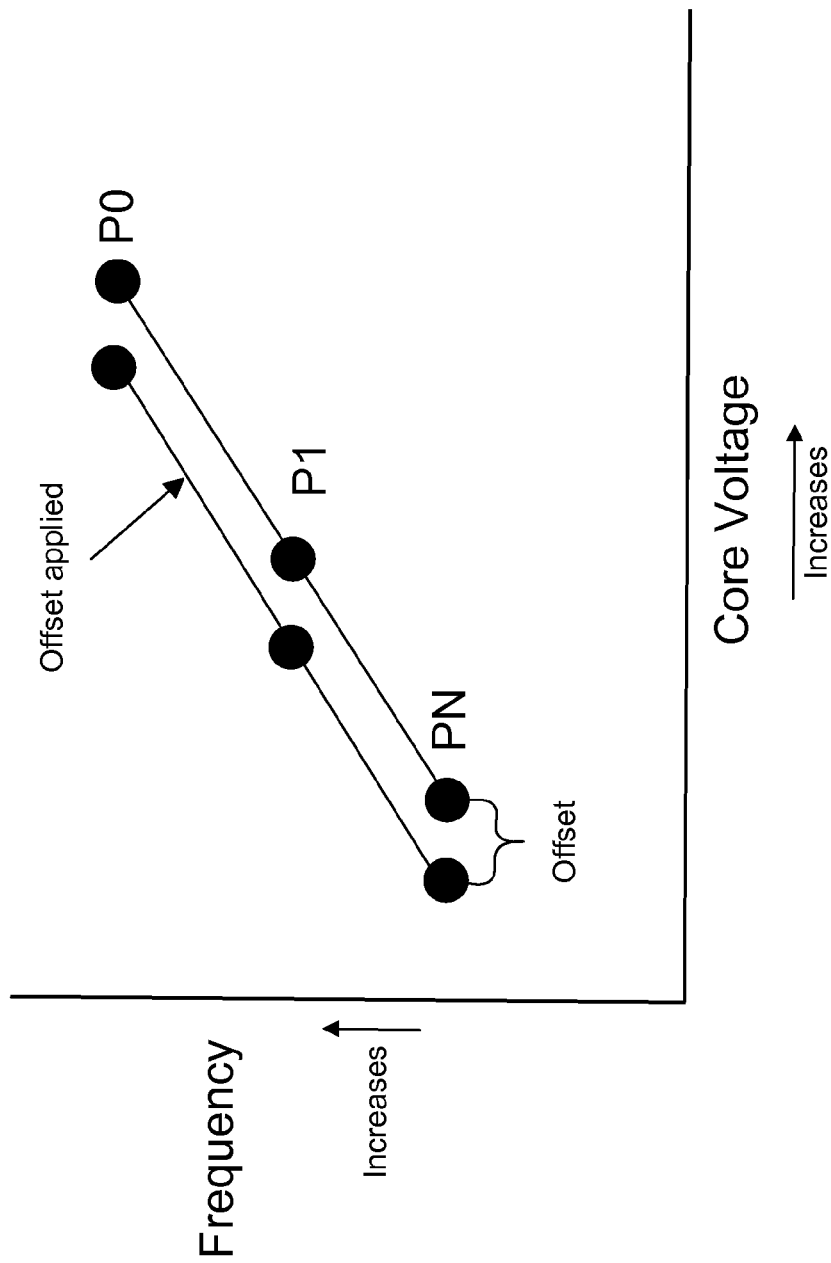
FIG. 3 is a graph depicting an example of an offset applied to processing states of a processor core.

In the embodiment depicted in FIG. 1 a single frequency, F_core, is supplied to all core processors in the multi-core processor. If another processor state is selected then a different frequency will be supplied to the cores. In one example embodiment, the offset shifts the voltage down for each processor state as depicted in the graph of FIG. 3.

Figure 4:
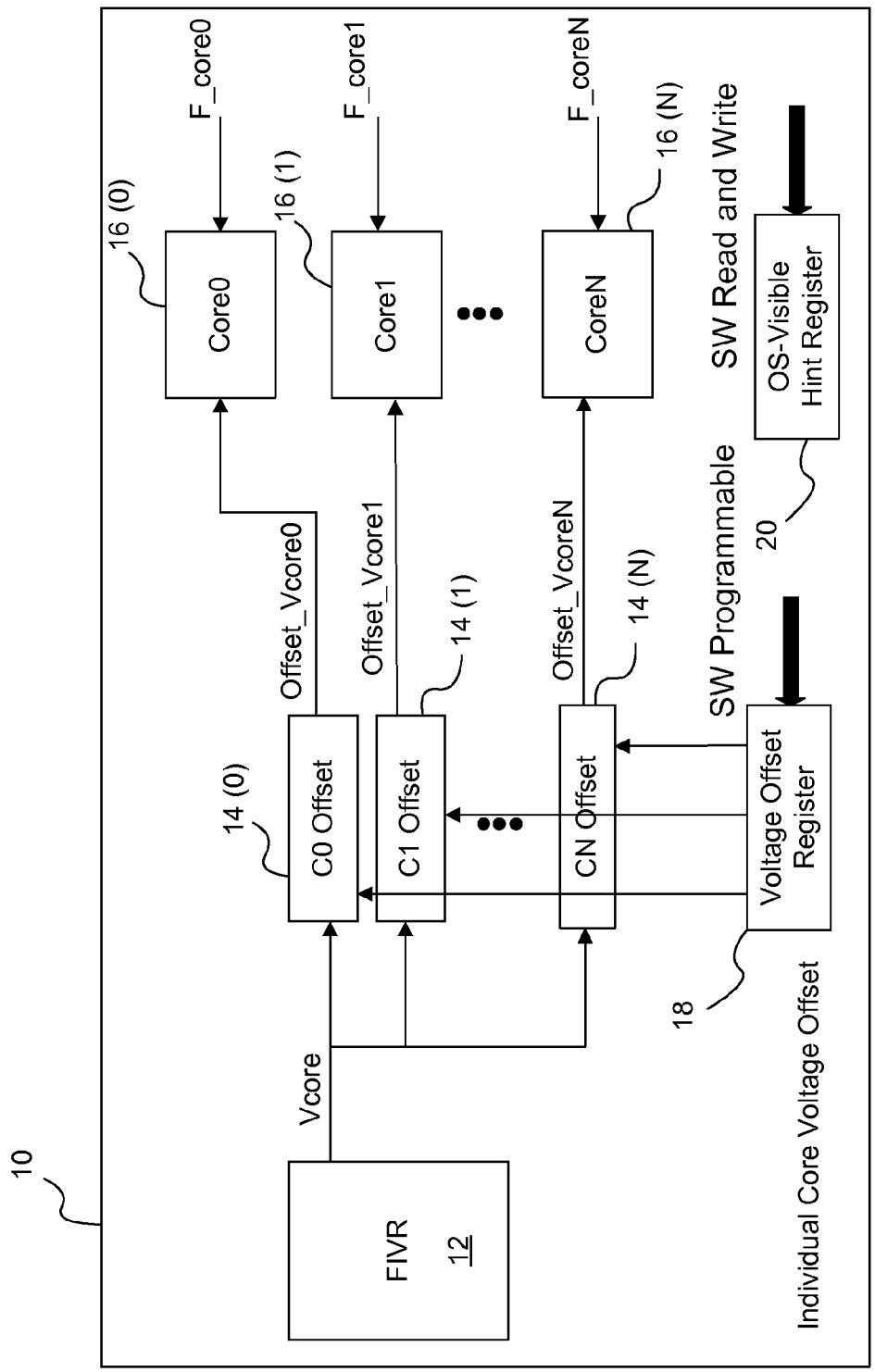
FIG. 4 is a block diagram of another example embodiment.

In the above described example embodiments, a single F_core frequency is supplied to all core processors and the voltage offsets all reduce the value of VCORE. FIG. 4 depicts an alternate embodiment that allows for the voltage offsets to increase the voltage supplied to a core processor relative to VCORE.

In FIG. 4 a separate F_core(n) is supplied to each core and the voltage offsets may be programmed to positively or negatively offset VCORE. Supplying separate F_cores to each core allows increases in processing speed while not changing the power envelope. In this case the frequency of selected cores could be increased to increase processing speed and VCORE would be offset negatively to lower power consumption.

Alternatively, the power envelope could be increased to allow each core to have an increased frequency and a positive offset to VCORE. This would be an over-clocking mode of the multi-core processor and the user would need to guarantee that the multi-core processor has sufficient power and thermal cooling headroom.

This example embodiment provides flexibility to increase processor efficiency in CPU intensive activities such as gaming.

FIG. 5 is a block diagram of a system including a multi-core processor having the core voltage margining feature.

Referring to FIG. 5, in some embodiments, the multi-core processor 10 may be coupled to a local bus 502 along with a north bridge, or memory hub 504. The memory hub 504 may represent a collection of semiconductor devices, or a "chip set," and provide interfaces to a Peripheral Component Interconnect (PCI) bus 516 and an Accelerated Graphics Port (AGP) bus 510. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A graphics accelerator 512 may be coupled to the AGP bus 510 and provide signals to drive a display 514. The PCI bus 516 may be coupled to a network interface card (NIC) 520, for example. The memory hub 504 may also provide an interface to a memory bus 506 that is coupled to a system memory 508.

A south bridge, or input/output (I/O) hub 524, may be coupled to the memory hub 504 via a hub link 522. The I/O hub 524 represents a collection of semiconductor devices, or a chip set, and provides interfaces for a hard disk drive 538, a CD-ROM drive 540 and an I/O expansion bus 526, as just a few examples. An I/O controller 528 may be coupled to the I/O expansion bus 526 to receive input data from a mouse 532 and a keyboard 534. The I/O controller 528 may also control operations of a floppy disk drive 530.

The example embodiments depicted in FIGS. 1 and 4 include multiple cores on a single IC. However, the embodiments described above may be implemented on multi-core processors with the processor cores and other circuitry distributed over multiple interconnected ICs.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
a computer processor;
a plurality of voltage offset blocks disposed on a multi-core processor with each voltage offset block comprising a voltage input to receive a supply voltage level, a control input to receive an offset code, and a voltage output coupled to a respective core processor in the multi-core processor, wherein each voltage offset block is configured to offset the supply voltage level by a voltage offset value programmed by an offset code received at the control input of the voltage offset block;
a voltage offset register comprising a plurality of control outputs each coupled to a corresponding control input of the voltage offset blocks, where the voltage offset register is configured to hold an offset code for each voltage offset block and to provide the offset code, programming the voltage offset value of a selected voltage offset block, at the control output coupled to the selected voltage offset block; and
a voltage margin hint register to supply an ordering of voltage margins based on the voltage offset values associated with the voltage offset register and not the actual values of the voltage margins associated with each core of the multi-core processor to an operating system wherein the operating system is to use the ordering of the voltage margins as a parameter to determine a core of the multi-core processor to park or a core of the multi-core processor to add.

2. The apparatus of claim 1 where a first core processor receives a frequency, F_core(1), and where the first core processor has a stable operating point for F_core(1) at a first reduced voltage level equal to the difference between the supply voltage and a first voltage offset value and where a first offset code held in the voltage offset register programs a first voltage offset block coupled to the first core processor to offset the supply voltage by the first voltage offset value to output the first reduced voltage level.

3. The apparatus of claim 1 where a first core processor receives a first frequency, F_core(1), where the first core processor has a stable operating point for F_core(1) at a first reduced voltage level equal to the difference between the supply voltage and a first voltage offset value and where a first offset code held in the voltage offset register programs a first voltage offset block coupled to the first core processor to offset the supply voltage by the first voltage offset value to output the first reduced voltage level and where a second core processor receives a second frequency, F_core(2), where the second core processor has a stable operating point for F_core (2) at a first increased voltage level equal to the sum of the supply voltage and a second voltage offset value and where a second offset code held in the voltage offset register programs a second voltage offset block coupled to the second core processor to offset the supply voltage by the second voltage offset value to output the first increased voltage level.

4. The apparatus of claim 1 further comprising:
an integrated voltage regulator disposed on the multi-core processor that outputs the supply voltage level.

5. A method for reducing power consumed by a multi-core processor comprising:
determining a first voltage offset value that may be applied to a common supply voltage level, with the common supply voltage supplied to all processor cores in the multi-core processor, to reduce the common supply voltage level to a first reduced supply voltage level that does not adversely affect operating stability of a first processor core;
offsetting the common supply voltage level by the first voltage offset value to form the first reduced supply voltage level;
supplying the first reduced supply voltage level to the first core processor to reduce power consumption; and
reading a voltage margin hint register to supply an ordering of voltage margins based on voltage offset values associated with a voltage offset register configured to hold an offset code for each voltage offset block disposed on the multi-core processor and not the actual values of the voltage margins associated with each core of the multi-core processor to an operating system wherein the operating system is to use the ordering of the voltage margins as a parameter to determine a core of the multi-core processor to park or a core of the multi-core processor to add.

6. The method of claim 5 further comprising:
determining a second voltage offset value that may be applied to the common supply voltage level to reduce the common supply voltage level to a second reduced supply voltage level that does not adversely affect operating stability of a second processor core in the multi-core processor.

7. The method of claim 6, further comprising:
offsetting the common supply voltage level by the second voltage offset value to form the second reduced supply voltage level.

8. The method of claim 7, further comprising:
supplying the second reduced supply voltage supply level to the second core processor to reduce power consumption.

9. The method of claim 8, further comprising:
supplying an indication of which of the first or second reduced supply voltage levels is smaller to an operating system so that the operating system may schedule threads to execute on a processor core that consumes less power.

10. The method of claim 5, further comprising:
in a case of a single core mode, determining a core associated with a largest voltage margin; and
in a case that a determination is made to add a core to the single core mode, determining a core associated with a next largest voltage margin.

11. A system comprising:
a chipset;
a multi-core processor coupled to the chipset, with the multi-core processor including voltage offset blocks configured to offset voltage levels provided to each core processor in the multi-core processor to reduce power consumption wherein the multi-core processor comprises (i) a plurality of voltage offset blocks disposed on the multi-core processor with each voltage offset block comprising a voltage input to receive a supply voltage level, a control input to receive an offset code, and a voltage output coupled to a respective core processor in the multi-core processor, with each voltage offset block configured to offset the supply voltage level by a voltage offset value programmed by an offset code received at the control input of the voltage offset block, (ii) a voltage offset register comprising a plurality of control outputs each coupled to a corresponding control input of the voltage offset blocks, where the voltage offset register is configured to hold an offset code for each voltage offset block and to provide the offset code, programming the voltage offset value of a selected voltage offset block, at the control output coupled to the selected voltage offset block, and (iii) a voltage margin hint register to supply an ordering of voltage margins based on the voltage offset values associated with the voltage offset register and not the actual values of the voltage margins associated with each core of the multi-core processor to an operating system wherein the operating system is to use the ordering of the voltage margins as a parameter to determine a core of the multi-core processor to park or a core of the multi-core processor to add.

12. The system of claim 11 where a first core processor receives a frequency, F_core(1), and where the first core processor has a stable operating point for F_core(1) at a first reduced voltage level equal to the difference between the supply voltage and a first voltage offset value and where a first offset code held in the voltage offset register programs a first voltage offset block coupled to the first core processor to offset the supply voltage by the first voltage offset value to output the first reduced voltage level.

13. The system of claim 11 where a first core processor receives a first frequency, F_core(1), where the first core processor has a stable operating point for F_core(1) at a first reduced voltage level equal to the difference between the supply voltage and a first voltage offset value and where a first offset code held in the voltage offset register programs a first voltage offset block coupled to the first core processor to offset the supply voltage by the first voltage offset value to output the first reduced voltage level and where a second core processor receives a second frequency, F_core(2), where the second core processor has a stable operating point for F_core(2) at a first increased voltage level equal to the sum of the supply voltage and a second voltage offset value and where a second offset code held in the voltage offset register programs a second voltage offset block coupled to the second core processor to offset the supply voltage by the second voltage offset value to output the first increased voltage level.

14. The system of claim 11 further comprising:
an integrated voltage regulator disposed on the multi-core processor that outputs the supply voltage level.

* * * * *